J. S. & E. W. YOUNG & J. L. SCHECHER.
CASTER.
APPLICATION FILED MAR. 27, 1917.
1,301,777. Patented Apr. 22, 1919.
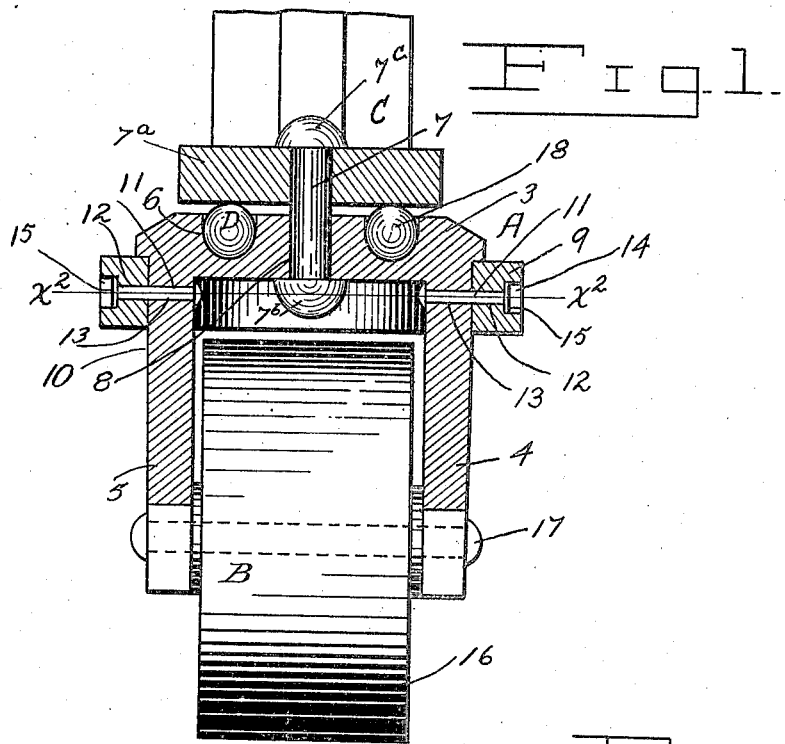
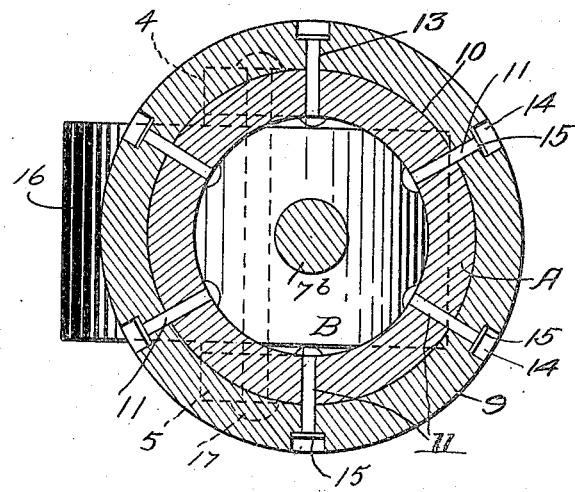
Witnesses.
H. Gearing.
Alfred H. Daehler.
Inventors
John Simon Young,
Edward W. Young and
John L. Schecher,
By
Their Attorney.

UNITED STATES PATENT OFFICE.

JOHN SIMON YOUNG, EDWARD W. YOUNG, AND JOHN L. SCHECHER, OF LOS ANGELES, CALIFORNIA.

CASTER.

1,301,777. Specification of Letters Patent. Patented Apr. 22, 1919.

Application filed March 27, 1917. Serial No. 157,758.

*To all whom it may concern:*

Be it known that we, JOHN SIMON YOUNG, EDWARD W. YOUNG, and JOHN L. SCHECHER, all citizens of the United States, residing at Los Angeles, in the county of Los Angeles and State of California, have jointly invented new and useful Improvements in Casters, of which the following is a specification.

This invention relates to casters, and more particularly to casters for beds and other furniture. The invention has for its object to provide an improved caster of the general nature stated which will prevent the bed or other piece of furniture equipped with casters, organized in accordance with the invention, from coming into contact with the walls of a room or closet; to this end each caster is provided with a buffer which projects beyond other caster features and preferably beyond the bed or other piece of furniture mounted on the caster.

The invention has for a further object to provide an improved caster which will be superior in point of relative simplicity and inexpensiveness of construction and organization, taken in consideration with the advantages of use, and sightliness in appearance, and which will be generally superior in efficiency and serviceability.

This invention is disclosed in another application for U. S. Patent filed by us November 17, 1915, Serial No. 61,889, for folding beds, of which this application is a division.

With the above and other objects in view, the invention consists in the novel and useful provision, construction, formation, combination and inter-relation of parts, members and features, all as hereinafter described, shown in the drawing and finally pointed out in claims.

In the drawing:

Figure 1 is a central vertical sectional view of a caster constructed and organized in accordance with the invention, parts being in elevation for clearness of illustration; and Fig. 2 is a horizontal sectional view taken on the line $x^2-x^2$, Fig. 1, and looking downwardly.

Corresponding parts in both the figures are designated by the same reference characters.

Referring with particularity to the drawing, in the form of the invention therein shown, A designates a caster frame member, B designates a roller member, C designates a foot or corner member of a folding bed with which the caster is shown as associated, and D designates anti-friction means between the foot C and the frame member A. The frame member A preferably comprises in integral construction a yoke 3, a depending furcation 4, and a depending furcation 5. The yoke is preferably provided with an annular groove 6 concentric with a pivot pin 7 which is shown as uniting the frame member yoke 3 with the foot C, the pivot pin 7 being shown as a rivet passed through a horizontal flange $7^a$ provided on the foot C and through a bore 8 provided in the yoke 3.

A buffer member 9 is applied to the yoke 3 of the frame member A, such yoke 3 being formed with an annular outer wall 10 over which the buffer is fitted, the buffer member 9 being annular in form and preferably constructed of rubber, felt or other yielding material. The buffer member 9 may be secured in position by rivets 11 each passed through a suitable bore 12 provided in the buffer member and through a suitable bore 13 provided in the annular side walls of the yoke member. The buffer member 9 may be counter-bored as at 14 to accommodate heads 15 on the rivets 11. Such counter-bores permit of the buffer member 9 yielding, due to impact, without permitting the rivet heads to contact with the walls of a room or furniture therein.

The roller B is conventionally shown as a cylinder 16 of suitable material, such as wood or the like, and mounted to rotate upon a pin or rivet 17 passed through the furcations 4 and 5 of the frame member A.

The anti-friction means D are shown as a plurality of balls 18 disposed in the annular groove 6 in the yoke of the member A and confined in said groove by the horizontal portion $7^a$ of the foot C, the frame member A and the foot being assembled as by heading over the rivet 7 as at $7^b$ and $7^c$.

The circular yoke 3 preferably slightly overhangs the furcations 4 and 5, and as such furcations are slightly angularly related to the yoke 3, the rivet 7 is positioned at one side of the rivet 17 or pivotal axis of the roller or cylinder 16, so that upon shifting the bed to which the caster is applied, the pivot pin or rivet 7 will lead the roller, the caster turning so as to follow the bed and presenting a portion of the buffing annulus or member 9 to a wall which otherwise would be struck or contacted with by the bed or features thereof.

It is manifest that many changes and variations may be made in departing from the specific disclosure herein without departing from the spirit of the invention and the terms of the following claim:

Having thus disclosed our invention, we claim and desire to secure by Letters Patent:

A caster including a yoke member formed with annular side walls and a top having an annular raceway therein, anti-friction balls loose within the raceway, a pivot pin extending upwardly from the top at the center of the raceway, integral furcations projecting downwardlly from opposite sides of the yoke, a roller journaled between the furcations, and a buffer ring extending around the annular side walls of the yoke and projecting on all sides beyond the roller and yoke.

In testimony whereof, we have signed our names to this specification in the presence of two subscribing witnesses.

JOHN SIMON YOUNG.
EDWARD W. YOUNG.
JOHN L. SCHECHER.

Witnesses:
ALFRED H. DACHLER,
ED. CARL WHITE.

Copies of this patent may be obtained for five cents each, by addressing the "Commissioner of Patents, Washington, D. C."